US012776900B2

(12) United States Patent
Rahman et al.

(10) Patent No.: US 12,776,900 B2
(45) Date of Patent: Oct. 27, 2026

(54) QUANTUM SECURE ANONYMOUS COMMUNICATION NETWORKS

(71) Applicant: Cisco Technology, Inc., San Jose, CA (US)

(72) Inventors: Mohammad Saidur Rahman, Los Angeles, CA (US); Stephen DiAdamo, Munich (DE); Miralem Mehic, Sarajevo (BA); Charles E. Fleming, Oxford, MS (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 283 days.

(21) Appl. No.: 18/430,099

(22) Filed: Feb. 1, 2024

(65) Prior Publication Data

US 2025/0254034 A1 Aug. 7, 2025

(51) Int. Cl.
*H04L 9/08* (2006.01)
*H04L 9/40* (2022.01)

(52) U.S. Cl.
CPC .......... *H04L 9/0855* (2013.01); *H04L 9/0819* (2013.01); *H04L 63/0421* (2013.01)

(58) Field of Classification Search
CPC .. H04L 9/0855; H04L 9/0819; H04L 63/0421
See application file for complete search history.

(56) References Cited

U.S. PATENT DOCUMENTS

| | | | | |
|---|---|---|---|---|
| 6,266,704 | B1 * | 7/2001 | Reed | H04L 63/0407 713/153 |
| 9,509,507 | B1 | 11/2016 | Hunt et al. | |
| 9,525,665 | B1 * | 12/2016 | Evans | H04L 63/0281 |
| 2011/0213979 | A1 | 9/2011 | Wiseman et al. | |
| 2014/0331050 | A1 | 11/2014 | Armstrong et al. | |

(Continued)

FOREIGN PATENT DOCUMENTS

| | | | | |
|---|---|---|---|---|
| CN | 105471576 A | | 4/2016 | |
| EP | 4187840 A1 | * | 5/2023 | H04L 9/0852 |

(Continued)

OTHER PUBLICATIONS

Malian et al. Post-Quantum Era Privacy Protection for Intelligent Infrastructures (Year: 2021), IEEE, pp. 36038-36077.*

(Continued)

*Primary Examiner* — Lynn D Feild
*Assistant Examiner* — Abdullah Almamun
(74) *Attorney, Agent, or Firm* — Edell, Shapiro & Finnan, LLC

(57) ABSTRACT

An embodiment provides a quantum-resistant technique for distributing symmetric or other keys (e.g., in quantum key distribution (QKD), etc.). The embodiment pertains to a protocol and network architecture that integrates QKD without the need for trusted nodes, thereby meeting the requirements of the Tor or other anonymous communication network and creating a quantum-secure anonymous communication network. The embodiment re-designs the key establishment and exchange mechanisms of Tor to incorporate QKD, and provides a theoretical guarantee of security against quantum-powered adversaries (QPAs) while meeting all network or system requirements.

20 Claims, 6 Drawing Sheets

(56) References Cited

U.S. PATENT DOCUMENTS

| | | | | |
|---|---|---|---|---|
| 2015/0172168 | A1* | 6/2015 | Picconi | H04L 47/825 709/241 |
| 2018/0069841 | A1 | 3/2018 | Benedek | |
| 2021/0083865 | A1* | 3/2021 | Obadia | H04L 9/0852 |
| 2025/0211428 | A1* | 6/2025 | White | H04L 9/40 |

FOREIGN PATENT DOCUMENTS

| | | | | |
|---|---|---|---|---|
| EP | 4191787 | A1 * | 6/2023 | A61N 5/04 |
| JP | 2008109717 | A * | 5/2008 | |

OTHER PUBLICATIONS

Bernstein D.J., et al., "Post-quantum Cryptography", Nature, vol. 549, Sep. 14, 2017, 16 pages.

Campbell E., et al., "Applying Quantum Algorithms to Constraint Satisfaction Problems", arXiv:1810.05582v2 [quant-ph], Jul. 16, 2019, pp. 1-30.

Dam D-T., et al., "A Survey of Post-Quantum Cryptography: Start of a New Race", Cryptography, MDPI, vol. 7, No. 40, Aug. 14, 2023, pp. 1-18.

Diadamo S., et al., "Packet Switching in Quantum Networks: A Path to Quantum Internet", Physical Review Research, Oct. 28, 2022, pp. 1-17.

FTC: "FTC Staff Report Finds Many Internet Service Providers Collect Troves of Personal Data, Users Have Few Options to Restrict Use", Oct. 21, 2021, 3 Pages.

Ghosh S., et al., "Post-Quantum Forward-Secure Onion Routing (Future Anonymity in Today's Budget)", American Clinical Neurophysiology Society, Jun. 2015, 21 Pages.

Gisin N., et al., "Quantum Cryptography", Reviews of Modern Physics, vol. 74, No. 1, Mar. 8, 2002, pp. 145-195.

Huttner B., et al., "Long-range QKD without Trusted Nodes is not Possible with Current Technology", npj Quantum Information, vol. 8, No. 108, Dec. 12, 2022, pp. 1-5.

Kang C., "F.C.C. Repeals Net Neutrality Rules", The New York Times, Dec. 14, 2017, 3 Pages.

Khattak S., et al., "A Look at the Consequences of Internet Censorship Through an ISP Lens", IMC'14, Nov. 5-7, 2014, pp. 271-283.

Liu Q., et al., "Advances in Chip-Based Quantum Key Distribution", Entropy, vol. 24, MDPI, Sep. 22, 2022, pp. 1-21.

Mee P., et al., "The Quantum Computing Threat is just a Matter of Time", OliverWyman, Retrieved on Jan. 19, 2024, 4 Pages.

Mehic M., et al., "Analysis of the Public Channel of Quantum Key Distribution Link", IEEE Journal of Quantum Electronics, vol. 53, No. 5, Oct. 2017, 8 Pages.

Mehic M., et al., "Quantum Key Distribution Networks, A Quality of Service Perspective", Springer, Sep. 2022, 232 Pages.

Montanaro A., "Quantum Algorithms: An Overview", npj Quantum Information, Jan. 12, 2016, pp. 1-8.

Nielsen M.A., et al., "Quantum Computation and Quantum Information", 10th Anniversary Edition, Massachusetts Institute of Technology, retrieved from https://profmcruz.files.wordpress.com/2017/08/quantum-computation-and-quantum-information-nielsen-chuang.pdf, on Jan. 19, 2024, 710 Pages.

Notzel J., et al., "Entanglement-Enhanced Communication Networks", 2020 IEEE International Conference on Quantum Computing and Engineering (QCE), Oct. 12-16, 2020, pp. 242-248.

NSA: "Post-Quantum Cybersecurity Resources", retrieved on Jan. 19, 2024, 7 Pages.

Peikert C., "A Decade of Lattice Cryptography", Feb. 17, 2016, 90 Pages.

Scarani V., et al., "The Security of Practical Quantum Key Distribution", Reviews of Modern Physics, vol. 81, Sep. 29, 2009, pp. 1301-1350.

Schanck J., et al., "A Quantum-safe Circuit-extension Handshake for Tor", National Institute of Standards and Technology, Apr. 2015, 13 Pages.

Shor P.W., "Polynomial-Time Algorithms for Prime Factorization and Discrete Logarithms on a Quantum Computer", SIAM Review, Aug. 30, 1995, vol. 41, No. 2, pp. 303-332.

Tor Project: "Servers", Tor Metrics, Retrieved on Jan. 19, 2024, 2 Pages.

Tujner Z., et al., "QSOR: Quantum-Safe Onion Routing", arXiv:2001.03418v1 [cs.CR], Jan. 10, 2020, pp. 1-14.

USENIX Association: "Tor: The Second-Generation Onion Router", Proceedings of the 13th USENIX Security Symposium, Aug. 9-13, 2004, 18 Pages.

Zsolt T., "Quantum-safe TOR", Eurecom Sophia Antipolis, Cyber Security (CSE), Aug. 30, 2019, 60 Pages.

Ghosh, S., "Post-Quantum Secure Onion Routing (Future Anonymity in Today's Budget)," NIST, Computer Security Resouce Centerl, https://csrc.nist.gov/csrc/media/events/workshop-on-cybersecurity-in-a-post-quantum-world/documents/papers/session3-kate-paper.pdf, Apr. 2015, 15 pages.

* cited by examiner

QUANTUM SECURE ANONYMOUS COMMUNICATION NETWORKS

TECHNICAL FIELD

The present disclosure relates to communication systems.

BACKGROUND

Anonymous communication networks enable browsing the Internet in a way that prevents the content being accessed from being traced back to the user. This affords a high level of privacy, thereby protecting individuals who may access sensitive or even prohibited content. The Tor (short for The Onion Router) network, which is an example of such an anonymous communication network developed by The Tor Project, employs a layered encryption scheme to encapsulate data packets using Tor nodes to obscure the routing process before the packets enter the public Internet. While the Tor network is capable of providing substantial privacy, its encryption relies on schemes, such as Rivest-Shamir-Adleman (RSA) and Diffie-Hellman, for distributing symmetric keys, which are vulnerable to quantum computing attacks and are currently in the process of being phased out.

DESCRIPTION OF EXAMPLE EMBODIMENTS

Overview

An embodiment provides a quantum-resistant technique for distributing symmetric or other keys (e.g., in quantum key distribution (QKD), etc.). The embodiment pertains to a protocol and network architecture that integrates QKD without the need for trusted nodes, thereby meeting the requirements of a Tor network or other anonymous communication networks and creating a quantum-secure anonymous communication network. The embodiment re-designs the key establishment and exchange mechanisms of Tor to incorporate QKD, and provides a theoretical guarantee of security against quantum-powered adversaries (QPAs) while meeting all network or system requirements.

EXAMPLE EMBODIMENTS

Anonymous communication networks enable browsing the Internet in a way that prevents the content being accessed from being traced back to the user. An embodiment provides a quantum-resistant technique for distributing symmetric or other keys (e.g., in quantum key distribution (QKD), etc.). Standard QKD networks depend on trusted nodes to relay keys across long distances. However, this reliance on trusted nodes does not meet the criteria necessary for establishing a Tor or other anonymous communication network circuit. The embodiment pertains to a protocol and network architecture that integrates QKD without the need for trusted nodes, thereby meeting the requirements of the Tor or other anonymous communication network and creating a quantum-secure anonymous communication network. The embodiment re-designs the key establishment and exchange mechanisms of Tor to incorporate QKD, and provides a theoretical guarantee of security against quantum-powered adversaries (QPAs) while meeting all network or system requirements.

While the present embodiments are described with respect to quantum secure communications in a Tor anonymous communication network, it will be appreciated that the quantum secure communications may be implemented for any anonymous communication or other networks (e.g., virtual private network (VPN), mixed network, networks with anonymous key distribution, etc.).

Figure 1:
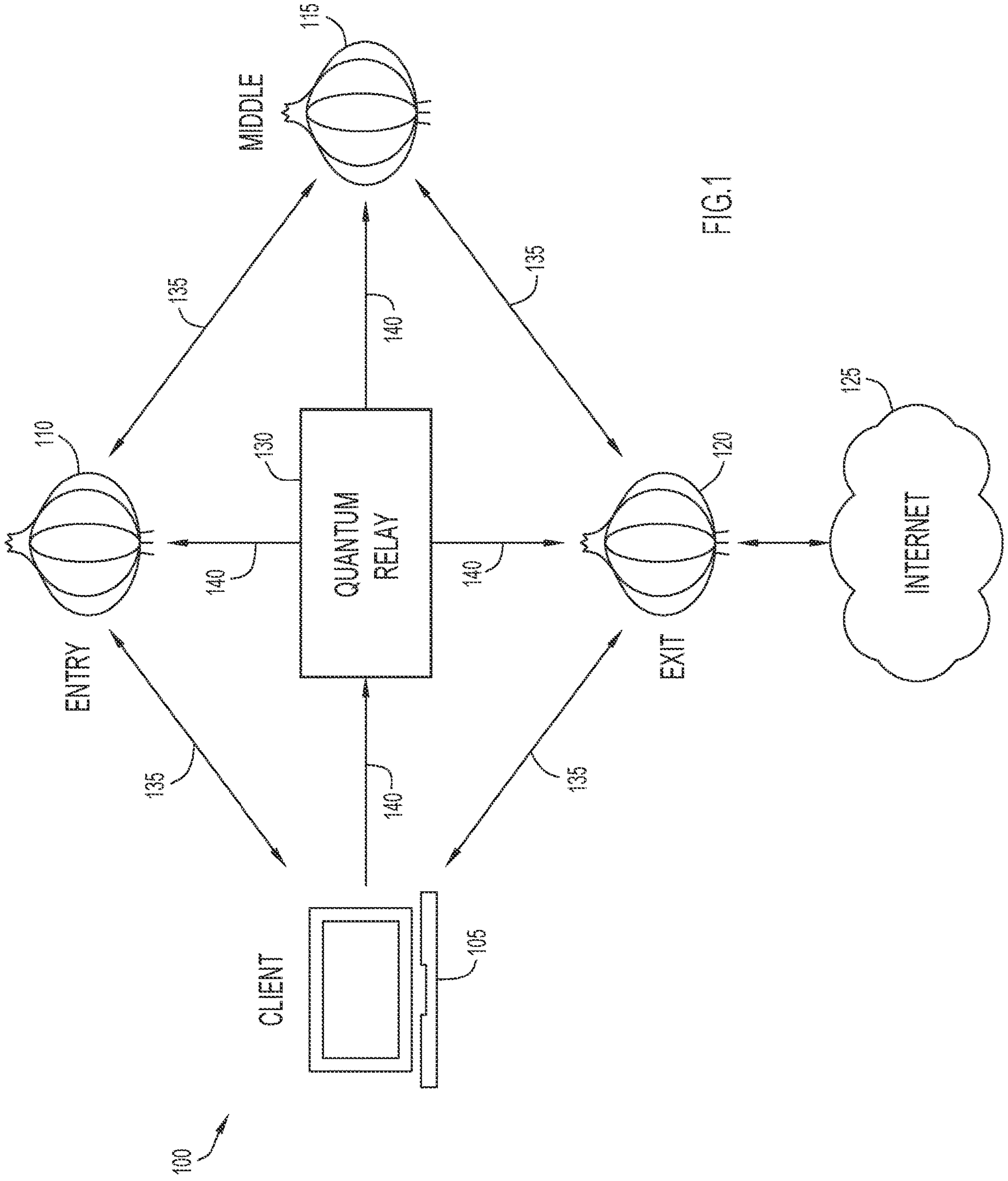
FIG. 1 is a block diagram of an example communication environment in which quantum secure anonymous communication may be implemented, according to an example embodiment.

FIG. 1 illustrates a block diagram of an example communication environment or system 100 in which an embodiment presented herein may be implemented. By way of example, environment 100 implements a Tor anonymous communication network. However, environment 100 may implement any anonymous communication or other networks (e.g., virtual private network (VPN), mixed network, networks with anonymous key distribution, etc.). Environment 100 includes a client or network device 105, an entry node 110, a middle node 115, an exit node 120, and a quantum relay 130. Client device 105 is classically coupled (via classical communication lines 135) to the entry, middle, and exit nodes (e.g., via a Tor network circuit). For example, corresponding classical communication lines 135 couple or connect the client device to the entry and exit nodes, the entry node to the middle node, and the middle node to the exit node to form Tor network circuits. A Tor network circuit may include a path from the client device through an entry node and any quantity of middle nodes to the exit node. The entry, middle, and exit nodes are also coupled or connected to quantum relay 130 via corresponding quantum channels 140. Client device 105 couples or connects to an input of quantum relay 130 via a corresponding quantum channel 140, and the output of the quantum relay (depending on the frequency) is sent over a corresponding quantum channel 140 to a particular node (e.g., entry node 110, middle node 115, exit node 120, etc.) as described below. Exit node 120 is coupled or connected to an external network 125 (e.g., the Internet, etc.) for receiving and processing requests from client device 105.

The Tor network enables anonymous communication (e.g., on the Internet, etc.) and employs a process referred to as onion routing. When client device 105 initiates a connection via the Tor network, the data does not travel directly to a destination. Instead, the data is encrypted multiple times and sent through a randomly selected sequence of nodes (e.g., an entry node, a middle node, and an exit node). Properties of a Tor network include that only the client device should be aware of the full path of a Tor circuit, which includes the entry, middle, and exit nodes, and each node in the Tor circuit should only be aware of its immediate predecessor (sender) and successor (receiver) in the path, such that the entry node knows only the client and the middle node, the middle node knows only the entry and the exit nodes, and the exit node knows only the middle node and the final destination.

Quantum key distribution (QKD) is based on securing information via fundamental properties of quantum mechanics. QKD enables the distribution of a symmetric or other key between parties. The security of QKD comes from the property that eavesdropping attempts on the communication channel are detectable, thereby serving as an alarm against adversaries. In order to generate the keys using QKD, client device 105 and nodes 110, 115, 120 include specialized quantum hardware devices (e.g., quantum devices 640 of FIG. 6). The quantum devices may include a quantum source, quantum transmitters and receivers, quantum channels, and a source of randomness. Client device 105 and nodes 110, 115, 120 further communicate classically for post-processing operations in order to complete the QKD protocol after quantum transmission.

Quantum key distribution (QKD) is a symmetric or other key distribution protocol that can work in many ways. In other words, there are various protocols that achieve the same security, each using some form of quantum communication. Embodiments may modify key establishment and exchange mechanisms of Tor to incorporate any conventional or other QKD protocol. An example QKD protocol that may be employed by embodiments includes BB84. BB84 works by preparing quantum states in a 0 or 1 state, or a superposition 0 or 1 state, randomly. It is not revealed to the receiver how the state is prepared, and so the receiver can only guess the basis to measure the state. Upon an error, they get a random output. Once the quantum transmission is complete, the sender and receiver transmit classical information (post-processing) to synchronize their preparation and measurement bases, perform error correction, and a privacy amplification operation (since error correction reveals information about the key).

Security of the protocol stems from the sender preparing the quantum state in one of two ways randomly. If there is an cavesdropper, they can only measure in a random basis and wait for the post-processing steps to occur to try to extract key information. In this case, when estimating how much error occurred in transmission, the cavesdropper's attempts at extracting information will be detectable. The sender and receiver abort key distribution in that case, throwing away any key material generated.

After performing a quantum key distribution (QKD) protocol, a symmetric or other key is generated between two hosts. Since embodiments cannot associate keys with users, as it would violate Tor network requirements discussed above, the embodiments provide keys with a synchronized unique identifier, and the nodes store and transmit the IDs of the keys.

Accordingly, in order to generate quantum keys between client device 105 and nodes 115, 120 without directly connecting them (to protect the identity of the client device per Tor network requirements), quantum relay 130 is employed. Quantum relay 130 establishes a quantum connection between client device 105 and entry node 110, middle node 115, and exit node 120. Quantum relay 130 may be any conventional or other device that can be a passive device with an input of frequency multiplexed signals. The signal, on arrival, can be routed to a particular output port passively. Quantum relay 130 does not need to process any classical information to make a routing decision (and therefore no classical information is sent). The quantum relay determines the frequency of the signal, which can only reveal the signal destination (e.g., entry, middle, or exit node). This information alone cannot be used to discover the Tor circuit, but can only discover the nodes that are acting as Tor nodes. Multiple client devices may transmit to various Tor circuits simultaneously, but knowing only the set of Tor nodes is not enough to determine the Tor circuits. Further, quantum relay 130 does not measure the quantum information that arrives, thereby keeping the information secret. If the quantum relay were to attempt to measure the quantum information, it would be detectable by the quantum key distribution (QKD) protocol and the key would not be used.

Figure 2:
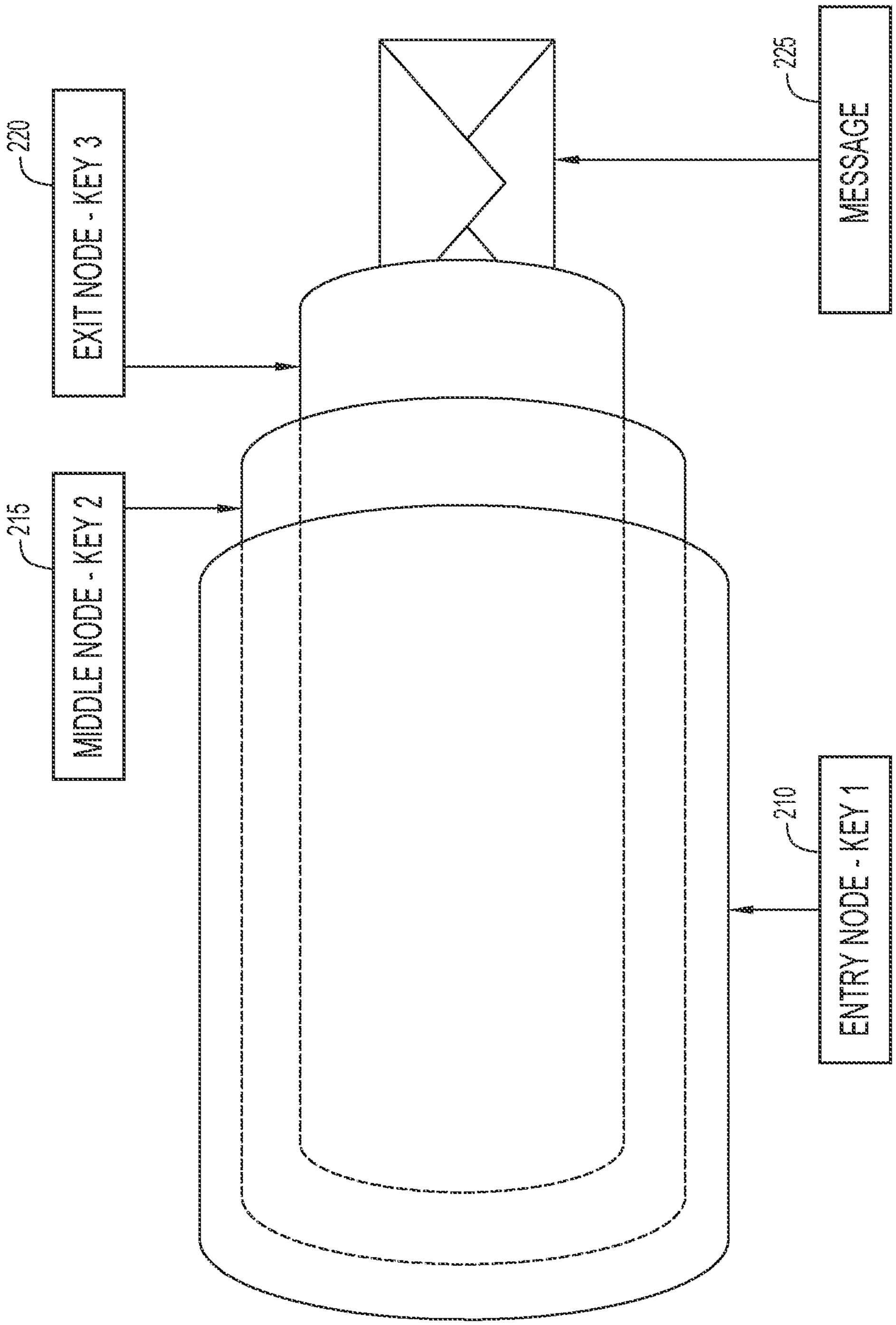
FIG. 2 illustrates a layered encryption of a message in the communication environment of FIG. 1, according to an example embodiment.
Figure 3:
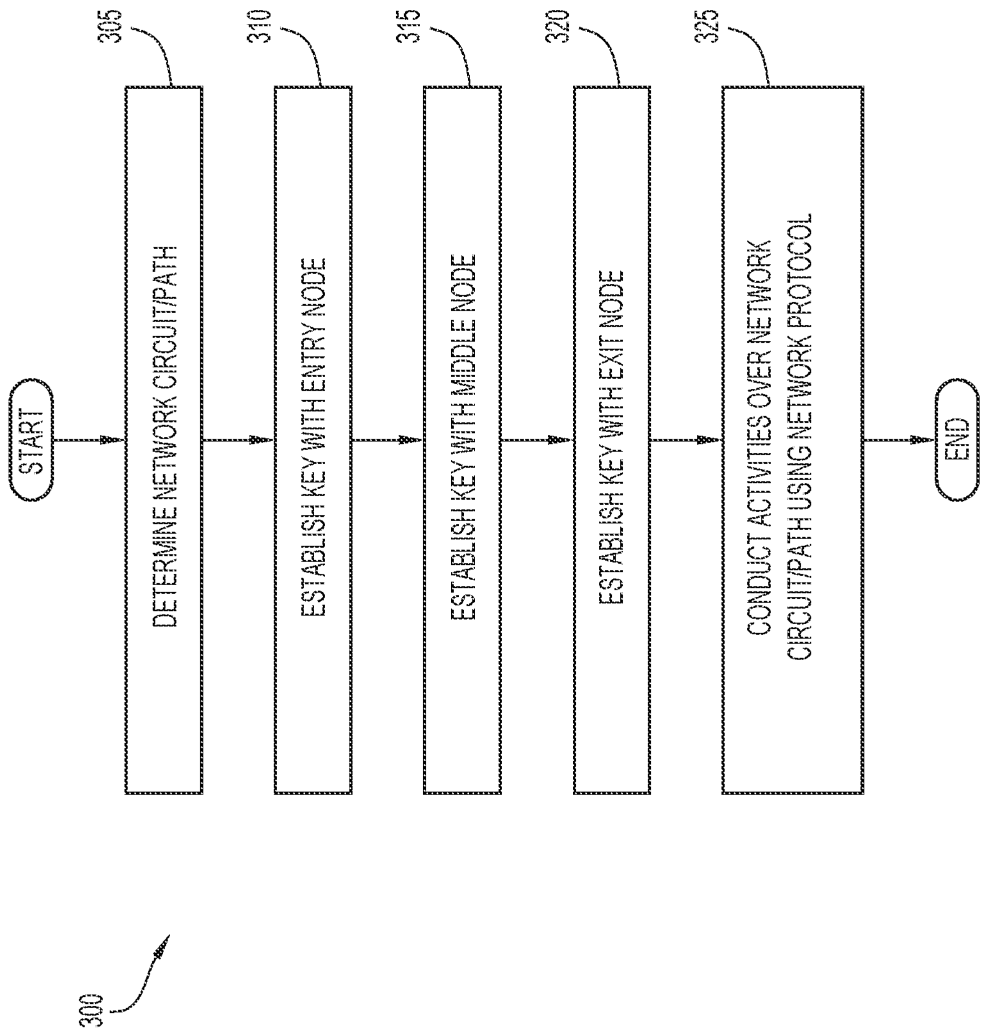
FIG. 3 illustrates a flowchart of a method for quantum secure anonymous communication, according to an example embodiment.
Figure 4:
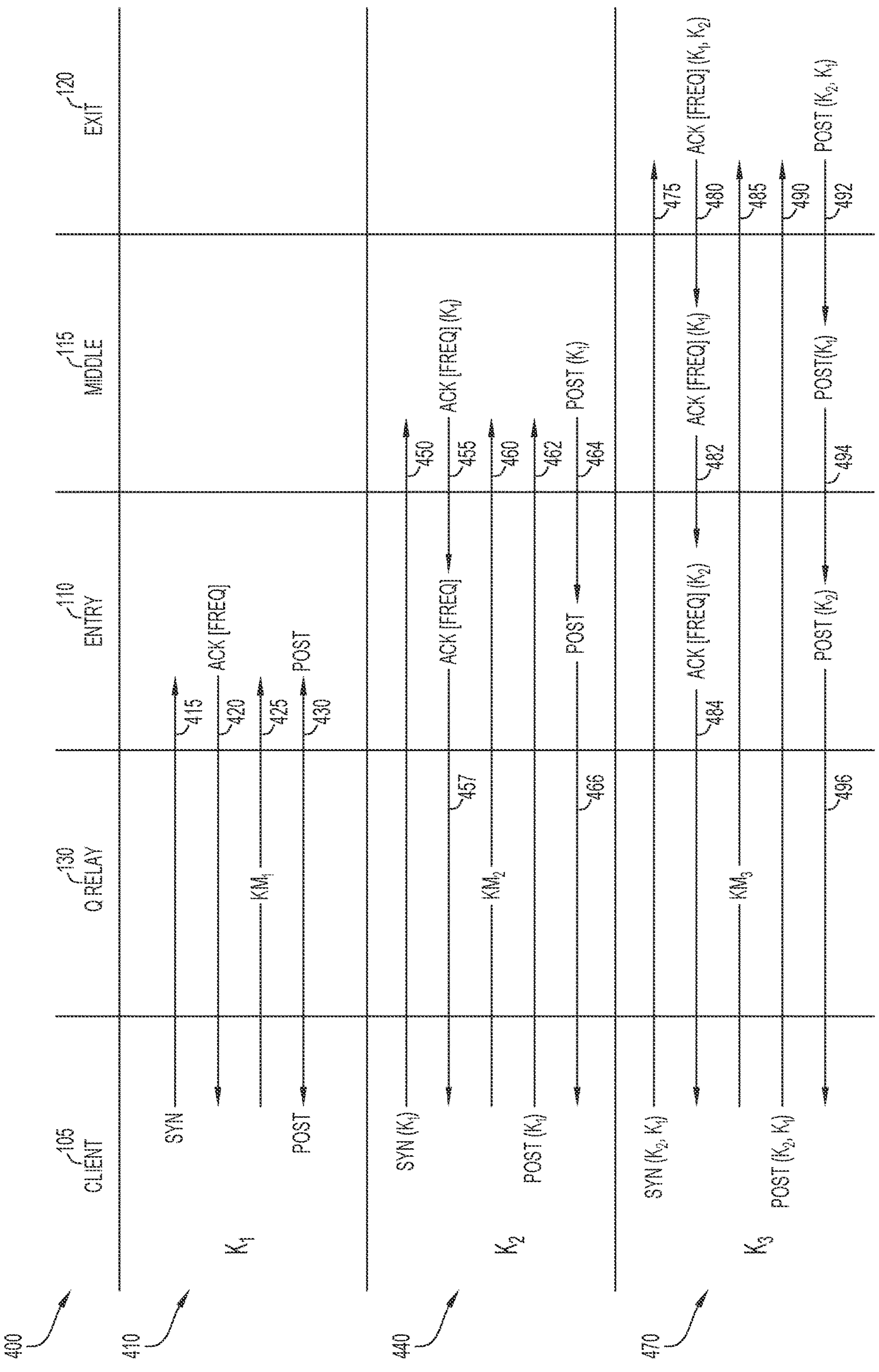
FIG. 4 illustrates a flow diagram of a method for quantum secure key exchange for quantum secure anonymous communication, according to an example embodiment.

In order to establish a protected pathway, client device 105 negotiates session keys with each relay (or node) in a chosen path as described below (FIGS. 3 and 4). Referring to FIG. 2, client device 105 may negotiate a key 210 with entry node 110, a key 215 with middle node 115, and a key 220 with exit node 120. Once the path and keys are established, the data (or message 225) is encrypted in layers corresponding to each relay key. This enables identities of nodes in the Tor circuit to be maintained in secrecy. For example, message 225 from client device 105 may have the originating or client device or node information encrypted with key 210 for entry node 110, entry node information encrypted with key 215 for middle node 115, and exit node information encrypted with key 220 for exit node 120. As data passes through each relay (e.g., entry, middle, and exit nodes), an encryption layer is peeled off by a corresponding key. Accordingly, by the time message 225 reaches its destination (e.g., Internet, etc.), it appears as though it originated from exit node 120, thereby obfuscating the true source (client device 105).

With continued reference to FIGS. 1 and 2, FIG. 3 illustrates a flowchart of a method 300 for quantum secure anonymous communication, according to an example embodiment. Initially, a network (or Tor) circuit or path is determined at operation 305. The network circuit may comprise entry node 110, middle node 115, and exit node 120. Only client device 105 can be aware of the entire path of the Tor circuit, and the client device generates a symmetric or other key (e.g., quantum key, etc.) with each of those nodes as described below. In order to generate the keys, separate communication paths are utilized including a path for classical communication and another path for quantum communication. The paths are established while masking the identity of client device 105 as described below. Entry node 110, middle node 115, and exit node 120 of the determined path each establish keys with client device 105 and continue the Tor protocol (for interaction with a destination) once the keys are established. Quantum channel 140 transmits quantum states to establish secure keys which safeguards later transmitted data. On the other hand, classical communication is used for regular Internet activities.

Client device 105 establishes a key with entry node 110 of the determined path at operation 310. Since every node (in the Tor network) is only aware of the node directly before and after it in the communication chain (e.g., client device 105 and entry node 110 know each other's identities), the key created between client device 105 and entry node 110 can use direct classical communication to establish a quantum channel 140 without the involvement of other parties. In order to establish the key, quantum relay 130 is placed in the middle of communication environment 100, forming a star-like topology. Client device 105 and entry node 110 synchronize their quantum (e.g., quantum key distribution (QKD)) devices (e.g., quantum source, quantum transmitter, quantum receiver, etc.). The quantum devices may be any conventional or other quantum devices to generate, transmit, and receive quantum signals (e.g., quantum devices 640 of FIG. 6). Client device 105 requests a synchronization, and entry node 110 responds (via classical communication) with a frequency to transmit the quantum signal, along with other common synchronization fields for QKD. Once synchronized, client device 105 tunes its quantum source to the frequency and transmits to quantum relay 130 to use the quantum channel and perform the QKD protocol to establish the key in substantially the same manner described below (FIG. 4).

In order to establish keys between client device 105 and middle node 115 and exit node 120, the middle and exit nodes are to remain unaware of the client device identity. In a quantum key distribution (QKD) network, trusted key-forwarding nodes are typically used. However, forwarding a key through entry node 110 to middle node 115, for example, does not suffice since it requires the entry node to have a copy of the key between the client device and middle node, thereby allowing the entry node to determine the exit node identity and violating a Tor network principle. Quantum relay 130 is used to address this issue. The quantum signals containing key material do not contain classical information and, therefore, once the quantum channel is established, the quantum information is sent anonymously.

Once the key with the entry node is established, client device 105 establishes a key with middle node 115 at operation 315. The client device synchronizes its quantum device with the middle node while protecting its identity. This is accomplished by making use of the key already generated with the entry node (e.g., encrypting the identity of the client device with the key for the entry node). Once the quantum devices of the client device and middle node are synchronized, the client device can generate the key with the middle node in substantially the same manner described below (FIG. 4).

Once the key with the middle node is established, client device 105 establishes a key with exit node 120 at operation 320. In a similar fashion, the client synchronizes its quantum device with the exit node while protecting the identities of the client device and entry node. This is accomplished by making use of the keys already generated with the entry node and middle node (e.g., encrypting the identity of the client device with the key for the entry node and encrypting the identity of the entry node with the key for the middle node). Once the quantum devices of the client device and exit node are synchronized, the client device can generate the key with the exit node in substantially the same manner described below (FIG. 4).

Once the keys are established with the entry, middle, and exit nodes, the Tor protocol enables activities with the destination (e.g., Internet) at operation 325 (via onion routing using the keys) with the assurance that all keys generated are secure (e.g., symmetric quantum keys, etc.).

An embodiment provides a protocol and network architecture that integrates quantum key distribution (QKD) without the need for trusted nodes. The embodiment redesigns the key establishment and exchange mechanisms of Tor or other anonymous communication network to incorporate QKD. With continued reference to FIGS. 1-3, FIG. 4 illustrates a flow diagram of a method 400 for quantum secure key exchange for quantum secure anonymous communication, according to an example embodiment. Initially, the communicating parties include, by way of example, client device 105, entry node 110, middle node 115, exit node 120, and quantum relay 130. The communications include classical messages (over classical communication lines 135) and quantum signals (over quantum channels 140). The classical messages may include a synchronization (Syn) message (e.g., a synchronization request), an acknowledgement (Ack) (e.g., an acknowledgment to the Syn) containing information of quantum key distribution (QKD) hardware for the client device 105, and post-processing messages (Post) for QKD. The quantum transmissions may include key material $KM_1$, $KM_2$, and $KM_3$ for corresponding keys $K_1$, $K_2$, and $K_3$ for the entry, middle, and exit nodes.

Initially, authentication is performed for the key distribution. A combination of conventional post-quantum cryptography (PQC) and quantum key distribution (QKD) techniques may be used for the authentication operation.

In line with Tor network principles, client device 105 and entry node 110 can know each other's identity. Accordingly, a key, $K_1$, between client device 105 and entry node 110 can be achieved at stage 410 using a quantum key distribution (QKD) protocol. This process does not require any additional parties. In order to establish key $K_1$, client device 105 sends a synchronization request (Syn) (via classical communication) to entry node 110 at flow 415. The entry node sends an acknowledgment (Ack) (via classical communication) to client device 105 at flow 420 containing a quantum transmission frequency. Client device 105 generates and transmits key material, $KM_1$, through quantum relay 130 (via quantum communication at the quantum transmission frequency) to entry node 110 at flow 425. The key material is post-processed at flow 430 using a series of communications between the client device and entry node (via classical communication) to complete the QKD protocol, thereby generating and sharing key $K_1$ between client device 105 and entry node 110.

A key, $K_2$, between client device 105 and middle node 115 is established at stage 440. The key $K_2$ is established without exposing the identity of client device 105 to middle node 115 (per Tor network requirements). Client device 105 determines the transmission frequency and performs device synchronization with middle node 115 without revealing its identity. In order to mask the client device identity, client device 105 prepares a synchronization (Syn) message, but uses key $K_1$ to encrypt (or lock) its true identity in the message, ensuring the key ID is in clear text. Client device 105 further spoofs its identity and designates entry node 110 to be the message source (or sender), and sends the message (via classical communication) to middle node 115 at flow 450.

Middle node 115 generates and sends an acknowledgement (Ack) to the synchronization (Syn) message to entry node 110 (via classical communication and based on the identity of the source indicated in the synchronization message) at flow 455. The acknowledgement includes a quantum transmission frequency. Entry node 110 has access to key $K_1$ to decrypt (or unlock) the true source of the message (client device 105), and transmits the acknowledgement (with the quantum transmission frequency) to the client device at flow 457 (via classical communication). This process can repeat until the quantum devices of the client and middle node are synchronized (e.g., identify a suitable quantum transmission frequency).

Once the quantum devices of client device 105 and middle node 115 are synchronized, client device 105 sends key material $KM_2$ through quantum relay 130 to middle node 115 (via quantum communication) at flow 460 by transmitting on the middle node quantum transmission frequency. Once the key material $KM_2$ is sent, the key material is post-processed using a series of communications between the client device, entry node, and middle node (via classical communication) to complete the quantum key distribution (QKD) protocol, thereby generating key $K_2$. In this case, client device 105 sends a post-processing communication (via classical communication and according to the QKD protocol) to middle node 115 at flow 462 with the client identity encrypted (or locked) with key $K_1$. The true identity of client device 105 is encrypted (or locked) with key $K_1$ in another post-processing communication sent from middle node 115 to entry node 110 (via classical communication and according to the QKD protocol) at flow 464. Entry node 110 has access to key $K_1$ to decrypt (or unlock) the true source (client device 105), and transmits a post-processing communication (via classical communication and according to the QKD protocol) to the client device at flow 466 for post-processing of key material $KM_2$ to generate and share key $K_2$ between the client device and middle node.

A key, $K_3$, between client device 105 and exit node 120 is established at stage 470. Initially, a synchronization (Syn) message is generated by client device 105 for exit node 120. The identities of the client device and entry node are hidden from the exit node (per Tor network requirements). The only node identity that can be revealed to exit node 120 is middle node 115. Accordingly, client device 105 encrypts (or locks), in an onion-like fashion, its true identity in the synchronization message using key $K_1$, leaving the key ID clear. The client device further encrypts (or locks) the identity of entry node 110 in the synchronization message using key $K_2$ (leaving the key ID clear), and sets the message source (or sender) as middle node 115. The synchronization message is sent from client device 105 to exit node 120 (via classical communication) at flow 475.

Exit node 120 generates an acknowledgement (Ack) to the synchronization message and sends the acknowledgement to middle node 115 at flow 480 (via classical communication and based on the identity of the source indicated in the synchronization message). The acknowledgement includes a quantum transmission frequency. Middle node 115 has access to key $K_2$ and decrypts (or unlocks) the identity of entry node 110 for forwarding of the acknowledgement to the entry node. The sender of the acknowledgement (exit node 120) is hidden from entry node 110. Accordingly, the source (or sender) is set to middle node 115, and the identity of the true sender (exit node 120) is encrypted (or locked) via key $K_2$. The acknowledgement is sent from middle node 115 to entry node 110 at flow 482. The entry node has access to key $K_1$ and decrypts (or unlocks) the identity of client device 105, and relays the acknowledgement to client device 105 (via classical communication) at flow 484 (with the identity of exit node 120 still encrypted (or locked) via key $K_2$).

Once the quantum devices of client device 105 and exit node 120 are synchronized, key material $KM_3$ is sent from client device 105 through quantum relay 130 to exit node 120 (via quantum communication) at the quantum transmission frequency of the exit node at flow 485. Once the key material $KM_3$ is sent, the key material is post-processed using a series of communications between the client device, entry node, middle node, and exit node (via classical communication) to complete the quantum key distribution (QKD) protocol, thereby generating and sharing key $K_3$ between client device 105 and exit node 120. In this case, client device 105 sends a post-processing communication (via classical communication and according to the QKD protocol) to exit node 120 at flow 490 with the client identity encrypted (or locked) with key $K_1$ and the identity of entry node 110 encrypted (or locked) with key $K_2$. The identity of entry node 110 is encrypted (or locked) with key $K_2$ and the identity of client device 105 is encrypted or locked with key $K_1$ in another post-processing communication sent from exit node 120 to middle node 115 (via classical communication and according to the QKD protocol) at flow 492. Middle node 115 has access to key $K_2$ to decrypt (or unlock) the identity of entry node 110, and transmits a post-processing communication (via classical communication and according to the QKD protocol) to the entry node at flow 494 with the identity of client device encrypted (or locked) using key $K_1$ and the identity of exit node 120 encrypted (or locked) using key $K_2$ (to keep the identity of the true source or exit node 120 hidden from entry node 110). Entry node 110 has access to key $K_1$ to decrypt (or unlock) the true source (client device 105), and transmits a post-processing communication to the client device (via classical communication and according to the QKD protocol) at flow 496 (with the identity of exit node 120 still encrypted using key $K_2$) for post-processing of key material $KM_3$ to generate and share key $K_3$ between the client device and exit node.

Figure 5:
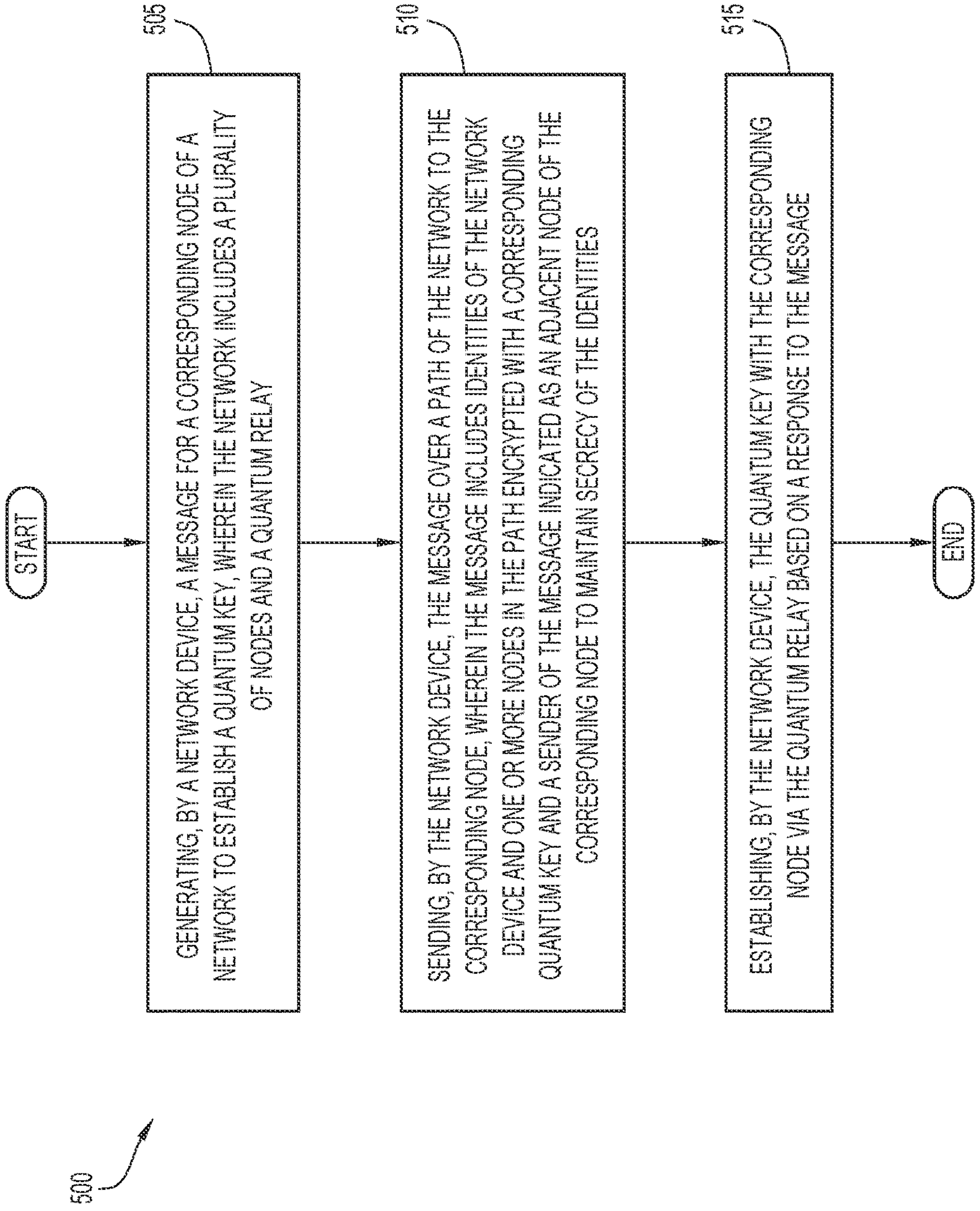
FIG. 5 illustrates a flowchart of a generalized method for quantum secure anonymous communication, according to an example embodiment.

FIG. 5 is a flowchart of an example method 500 for quantum secure anonymous communication, according to an example embodiment. At operation 505, a network device generates a message for a corresponding node of a network to establish a quantum key. The network includes a plurality of nodes and a quantum relay. At operation 510, the network device sends the message over a path of the network to the corresponding node. The message includes identities of the network device and one or more nodes in the path encrypted with a corresponding quantum key and a sender of the message indicated as an adjacent node of the corresponding node to maintain secrecy of the identities. At operation 515, the network device establishes the quantum key with the corresponding node via the quantum relay based on a response to the message.

Figure 6:
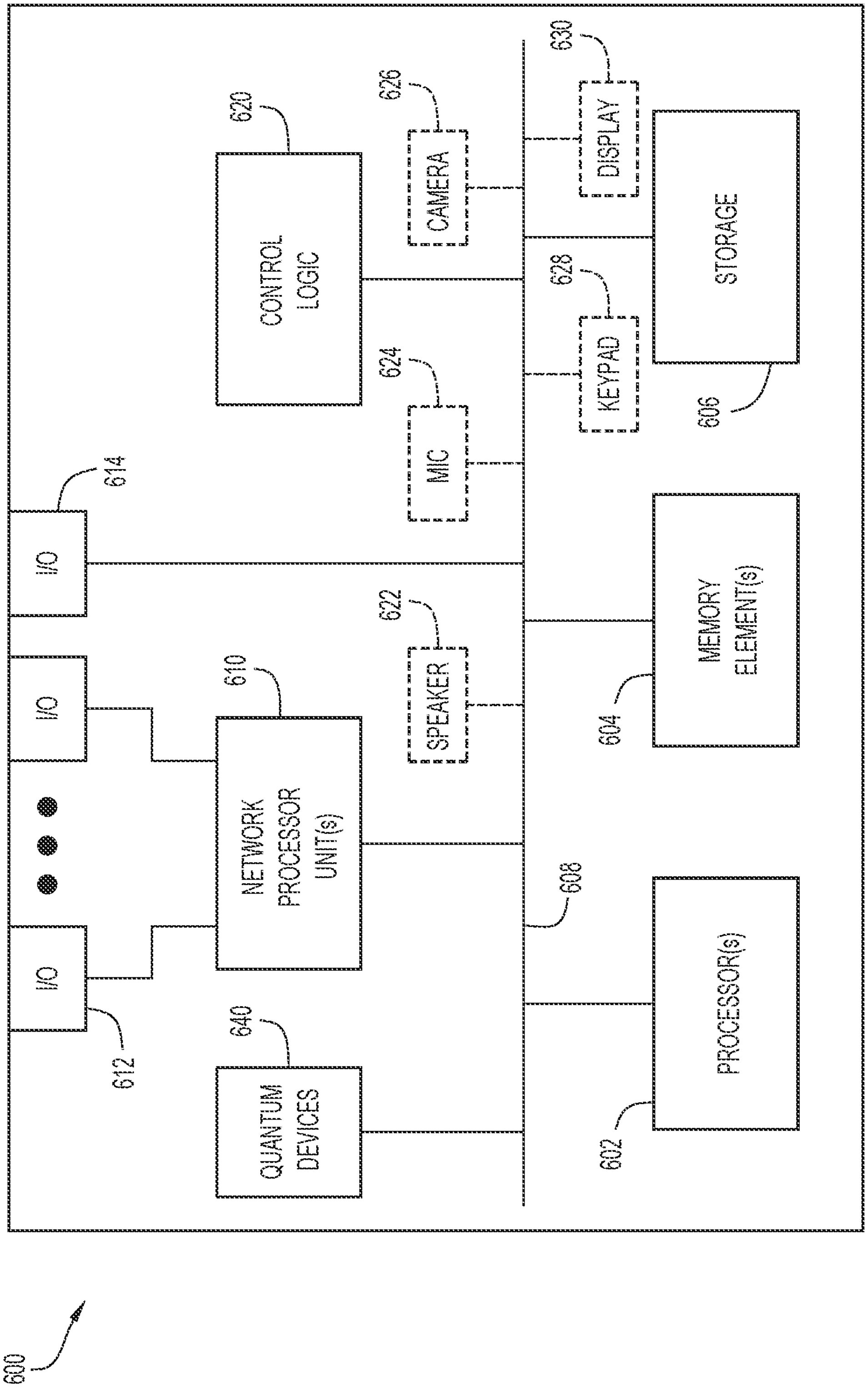
FIG. 6 illustrates a hardware block diagram of a computing device configured to perform functions associated with operations discussed herein, according to an example embodiment.

Referring to FIG. 6, FIG. 6 illustrates a hardware block diagram of a computing device 600 that may perform functions associated with operations discussed herein in connection with the techniques depicted in FIGS. 1-5. In various embodiments, a computing device or apparatus or system, such as computing device 600 or any combination of computing devices 600, may be configured as any device entity/entities (e.g., computer devices, user devices, client devices, communication devices, network devices or nodes, etc.) as discussed for the techniques depicted in connection with FIGS. 1-5 in order to perform operations of the various techniques discussed herein.

In at least one embodiment, computing device 600 may be any apparatus that may include one or more processor(s) 602, one or more memory element(s) 604, storage 606, a bus 608, one or more network processor unit(s) 610 interconnected with one or more network input/output (I/O) interface(s) 612, one or more I/O interface(s) 614, and control logic 620. In various embodiments, instructions associated with logic for computing device 600 can overlap in any manner and are not limited to the specific allocation of instructions and/or operations described herein.

In at least one embodiment, processor(s) 602 is/are at least one hardware processor configured to execute various tasks, operations and/or functions for computing device 600 as described herein according to software and/or instructions configured for computing device 600. Processor(s) 602 (e.g., a hardware processor) can execute any type of instructions associated with data to achieve the operations detailed herein. In one example, processor(s) 602 can transform an element or an article (e.g., data, information) from one state or thing to another state or thing. Any of potential processing elements, microprocessors, digital signal processor, baseband signal processor, modem, PHY, controllers, systems, managers, logic, and/or machines described herein can be construed as being encompassed within the broad term 'processor'.

In at least one embodiment, memory element(s) 604 and/or storage 606 is/are configured to store data, information, software, and/or instructions associated with computing device 600, and/or logic configured for memory element(s) 604 and/or storage 606. For example, any logic described herein (e.g., control logic 620) can, in various embodiments, be stored for computing device 600 using any combination of memory element(s) 604 and/or storage 606. Note that in some embodiments, storage 606 can be consolidated with memory elements 604 (or vice versa), or can overlap/exist in any other suitable manner.

In at least one embodiment, bus 608 can be configured as an interface that enables one or more elements of computing device 600 to communicate in order to exchange information and/or data. Bus 608 can be implemented with any architecture designed for passing control, data and/or information between processors, memory elements/storage, peripheral devices, and/or any other hardware and/or software components that may be configured for computing device 600. In at least one embodiment, bus 608 may be implemented as a fast kernel-hosted interconnect, potentially using shared memory between processes (e.g., logic), which can enable efficient communication paths between the processes.

In various embodiments, network processor unit(s) 610 may enable communication between computing device 600 and other systems, entities, etc., via network I/O interface(s) 612 to facilitate operations discussed for various embodiments described herein. In various embodiments, network processor unit(s) 610 can be configured as a combination of hardware and/or software, such as one or more Ethernet driver(s) and/or controller(s) or interface cards, Fibre Channel (e.g., driver(s) optical) and/or controller(s), wireless receivers/transmitters/transceivers, baseband processor(s)/modem(s), and/or other similar network interface driver(s) and/or controller(s) now known or hereafter developed to enable communications between computing device 600 and other systems, entities, etc. to facilitate operations for various embodiments described herein. In various embodiments, network I/O interface(s) 612 can be configured as one or more Ethernet port(s), Fibre Channel ports, any other I/O port(s), and/or antenna(s)/antenna array(s) now known or hereafter developed. Thus, the network processor unit(s) 610 and/or network I/O interfaces 612 may include suitable interfaces for receiving, transmitting, and/or otherwise communicating data and/or information in a network environment.

I/O interface(s) 614 allow for input and output of data and/or information with other entities that may be connected to computing device 600. For example, I/O interface(s) 614 may provide a connection to external devices such as a keyboard, keypad, a touch screen, and/or any other suitable input device now known or hereafter developed. In some instances, external devices can also include portable computer readable (non-transitory) storage media such as database systems, thumb drives, portable optical or magnetic disks, and memory cards. In still some instances, external devices can be a mechanism to display data to a user, such as, for example, a computer monitor, a display screen, or the like.

With respect to certain entities (e.g., client device, network device or nodes, etc.), computing device 600 may further include, or be coupled to, a speaker 622 to convey sound, microphone or other sound sensing device 624, camera or image capture device 626, a keypad or keyboard 628 to enter information (e.g., alphanumeric information, etc.), a touch screen or other display 630, and/or quantum devices 640. These items may be coupled to bus 608 or I/O interface(s) 614 to transfer data with other elements of computing device 600. Quantum devices 640 may include any conventional or other devices to generate, transmit, receive, and/or process quantum signals, such as a quantum source, quantum transmitters and receivers, quantum channels, and a source of randomness.

In various embodiments, control logic 620 can include instructions that, when executed, cause processor(s) 602 to perform operations, which can include, but not be limited to, providing overall control operations of computing device 600; interacting with other entities, systems, etc. described herein; maintaining and/or interacting with stored data, information, parameters, etc. (e.g., memory element(s), storage, data structures, databases, tables, etc.); combinations thereof; and/or the like to facilitate various operations for embodiments described herein.

The programs described herein (e.g., control logic 620) may be identified based upon application(s) for which they are implemented in a specific embodiment. However, it should be appreciated that any particular program nomenclature herein is used merely for convenience; thus, embodiments herein should not be limited to use(s) solely described in any specific application(s) identified and/or implied by such nomenclature.

Data relating to operations described herein may be stored within any conventional or other data structures (e.g., files, arrays, lists, stacks, queues, records, etc.) and may be stored in any desired storage unit (e.g., database, data or other stores or repositories, queue, etc.). The data transmitted between device entities may include any desired format and arrangement, and may include any quantity of any types of fields of any size to store the data. The definition and data model for any datasets may indicate the overall structure in any desired fashion (e.g., computer-related languages, graphical representation, listing, etc.).

The present embodiments may employ any number of any type of user interface (e.g., graphical user interface (GUI), command-line, prompt, etc.) for obtaining or providing information, where the interface may include any information arranged in any fashion. The interface may include any number of any types of input or actuation mechanisms (e.g., buttons, icons, fields, boxes, links, etc.) disposed at any locations to enter/display information and initiate desired actions via any suitable input devices (e.g., mouse, keyboard, etc.). The interface screens may include any suitable actuators (e.g., links, tabs, etc.) to navigate between the screens in any fashion.

The environment of the present embodiments may include any number of computer or other processing systems (e.g., client or end-user systems, server systems, network devices, storage devices, etc.) and databases or other repositories arranged in any desired fashion, where the present embodiments may be applied to any desired type of computing environment (e.g., cloud computing, client-server, network computing, mainframe, stand-alone systems, datacenters, etc.). The computer or other processing systems employed by the present embodiments may be implemented by any number of any personal or other type of computer or processing system (e.g., desktop, laptop, Personal Digital Assistant (PDA), mobile devices, etc.), and may include any commercially available operating system and any combination of commercially available and custom software. These systems may include any types of monitors and input devices (e.g., keyboard, mouse, voice recognition, etc.) to enter and/or view information.

It is to be understood that the software of the present embodiments may be implemented in any desired computer language and could be developed by one of ordinary skill in the computer arts based on the functional descriptions contained in the specification and flowcharts and diagrams illustrated in the drawings. Further, any references herein of software performing various functions generally refer to computer systems or processors performing those functions under software control. The computer systems of the present embodiments may alternatively be implemented by any type of hardware and/or other processing circuitry.

The various functions of the computer or other processing systems may be distributed in any manner among any number of software and/or hardware modules or units, processing or computer systems and/or circuitry, where the computer or processing systems may be disposed locally or remotely of each other and communicate via any suitable communications medium (e.g., Local Area Network (LAN), Wide Area Network (WAN), Intranet, Internet, hardwire, modem connection, wireless, etc.). For example, the functions of the present embodiments may be distributed in any manner among the various end-user/client, server, network devices, storage devices, and other processing devices or systems, and/or any other intermediary processing devices. The software and/or algorithms described above and illustrated in the flowcharts and diagrams may be modified in any manner that accomplishes the functions described herein. In addition, the functions in the flowcharts, diagrams, or description may be performed in any order that accomplishes a desired operation.

The networks of present embodiments may be implemented by any number of any type of communications network (e.g., LAN, WAN, Internet, Intranet, Virtual Private Network (VPN), etc.). The computer or other processing systems of the present embodiments may include any conventional or other communications devices to communicate over the network via any conventional or other protocols. The computer or other processing systems may utilize any type of connection (e.g., wired, wireless, etc.) for access to the network. Local communication media may be implemented by any suitable communication media (e.g., LAN, hardwire, wireless link, Intranet, etc.).

Each of the elements described herein may couple to and/or interact with one another through interfaces and/or through any other suitable connection (wired or wireless) that provides a viable pathway for communications. Interconnections, interfaces, and variations thereof discussed herein may be utilized to provide connections among elements in a system and/or may be utilized to provide communications, interactions, operations, etc. among elements that may be directly or indirectly connected in the system. Any combination of interfaces can be provided for elements described herein in order to facilitate operations as discussed for various embodiments described herein.

In various embodiments, any device entity or apparatus as described herein may store data/information in any suitable volatile and/or non-volatile memory item (e.g., magnetic hard disk drive, solid state hard drive, semiconductor storage device, Random Access Memory (RAM), Read Only Memory (ROM), Erasable Programmable ROM (EPROM), application specific integrated circuit (ASIC), etc.), software, logic (fixed logic, hardware logic, programmable logic, analog logic, digital logic), hardware, and/or in any other suitable component, device, element, and/or object as may be appropriate. Any of the memory items discussed herein should be construed as being encompassed within the broad term 'memory element'. Data/information being tracked and/or sent to one or more device entities as discussed herein could be provided in any database, table, register, list, cache, storage, and/or storage structure: all of which can be referenced at any suitable timeframe. Any such storage options may also be included within the broad term 'memory element' as used herein.

Note that in certain example implementations, operations as set forth herein may be implemented by logic encoded in one or more tangible media that is capable of storing instructions and/or digital information and may be inclusive of non-transitory tangible media and/or non-transitory computer readable storage media (e.g., embedded logic provided in: an ASIC, Digital Signal Processing (DSP) instructions, software [potentially inclusive of object code and source code], etc.) for execution by one or more processor(s), and/or other similar machine, etc. Generally, memory element(s) 604 and/or storage 606 can store data, software, code, instructions (e.g., processor instructions), logic, parameters, combinations thereof, and/or the like used for operations described herein. This includes memory elements 604 and/or storage 606 being able to store data, software, code, instructions (e.g., processor instructions), logic, parameters, combinations thereof, or the like that are executed to carry out operations in accordance with teachings of the present disclosure.

In some instances, software of the present embodiments may be available via a non-transitory computer useable medium (e.g., magnetic or optical mediums, magneto-optic mediums, Compact Disc ROM (CD-ROM), Digital Versatile Disc (DVD), memory devices, etc.) of a stationary or portable program product apparatus, downloadable file(s), file wrapper(s), object(s), package(s), container(s), and/or the like. In some instances, non-transitory computer readable storage media may also be removable. For example, a removable hard drive may be used for memory/storage in some implementations. Other examples may include optical and magnetic disks, thumb drives, and smart cards that can be inserted and/or otherwise connected to a computing device for transfer onto another computer readable storage medium.

Variations and Implementations

Embodiments described herein may include one or more networks, which can represent a series of points and/or network elements of interconnected communication paths for receiving and/or transmitting messages (e.g., packets of information) that propagate through the one or more networks. These network elements offer communicative interfaces that facilitate communications between the network elements. A network can include any number of hardware and/or software elements coupled to (and in communication with) each other through a communication medium. Such networks can include, but are not limited to, any Local Area Network (LAN), Virtual LAN (VLAN), Wide Area Network (WAN) (e.g., the Internet), Software Defined WAN (SD-WAN), Wireless Local Area (WLA) access network, Wireless Wide Area (WWA) access network, Metropolitan Area Network (MAN), Intranet, Extranet, Virtual Private Network (VPN), Low Power Network (LPN), Low Power Wide Area Network (LPWAN), Machine to Machine (M2M) network, Internet of Things (IoT) network, Ethernet network/switching system, any other appropriate architecture and/or system that facilitates communications in a network environment, and/or any suitable combination thereof.

Networks through which communications propagate can use any suitable technologies for communications including wireless communications (e.g., 4G/5G/nG, IEEE 802.11 (e.g., Wi-Fi®/Wi-Fi6®), IEEE 802.16 (e.g., Worldwide Interoperability for Microwave Access (WiMAX)), Radio-Frequency Identification (RFID), Near Field Communication (NFC), Bluetooth™, mm.wave, Ultra-Wideband (UWB), etc.), and/or wired communications (e.g., T1 lines, T3 lines, digital subscriber lines (DSL), Ethernet, Fibre Channel, etc.). Generally, any suitable means of communications may be used such as electric, sound, light, infrared, and/or radio to facilitate communications through one or more networks in accordance with embodiments herein.

Communications, interactions, operations, etc. as discussed for various embodiments described herein may be performed among entities that may be directly or indirectly connected utilizing any algorithms, communication protocols, interfaces, etc. (proprietary and/or non-proprietary) that allow for the exchange of data and/or information.

In various example implementations, any device entity or apparatus for various embodiments described herein can encompass network elements (which can include virtualized network elements, functions, etc.) such as, for example, network appliances, forwarders, routers, servers, switches, gateways, bridges, load-balancers, firewalls, processors, modules, radio receivers/transmitters, or any other suitable device, component, element, or object operable to exchange information that facilitates or otherwise helps to facilitate various operations in a network environment as described for various embodiments herein. Note that with the examples provided herein, interaction may be described in terms of one, two, three, or four device entities. However, this has been done for purposes of clarity, simplicity and example only. The examples provided should not limit the scope or inhibit the broad teachings of systems, networks, etc. described herein as potentially applied to a myriad of other architectures.

Communications in a network environment can be referred to herein as 'messages', 'messaging', 'signaling', 'data', 'content', 'objects', 'requests', 'queries', 'responses', 'replies', etc. which may be inclusive of packets. As referred to herein and in the claims, the term 'packet' may be used in a generic sense to include packets, frames, segments, datagrams, and/or any other generic units that may be used to transmit communications in a network environment. Generally, a packet is a formatted unit of data that can contain control or routing information (e.g., source and destination address, source and destination port, etc.) and data, which is also sometimes referred to as a 'payload', 'data payload', and variations thereof. In some embodiments, control or routing information, management information, or the like can be included in packet fields, such as within header(s) and/or trailer(s) of packets. Internet Protocol (IP) addresses discussed herein and in the claims can include any IP version 4 (IPv4) and/or IP version 6 (IPv6) addresses.

To the extent that embodiments presented herein relate to the storage of data, the embodiments may employ any number of any conventional or other databases, data stores or storage structures (e.g., files, databases, data structures, data or other repositories, etc.) to store information.

Note that in this Specification, references to various features (e.g., elements, structures, nodes, modules, components, engines, logic, steps, operations, functions, characteristics, etc.) included in 'one embodiment', 'example embodiment', 'an embodiment', 'another embodiment', 'certain embodiments', 'some embodiments', 'various embodiments', 'other embodiments', 'alternative embodiment', and the like are intended to mean that any such features are included in one or more embodiments of the present disclosure, but may or may not necessarily be combined in the same embodiments. Note also that a module, engine, client, controller, function, logic or the like as used herein in this Specification, can be inclusive of an executable file comprising instructions that can be understood and processed on a server, computer, processor, machine, compute node, combinations thereof, or the like and may further include library modules loaded during execution, object files, system files, hardware logic, software logic, or any other executable modules.

It is also noted that the operations and steps described with reference to the preceding figures illustrate only some of the possible scenarios that may be executed by one or more device entities discussed herein. Some of these operations may be deleted or removed where appropriate, or these steps may be modified or changed considerably without departing from the scope of the presented concepts. In addition, the timing and sequence of these operations may be altered considerably and still achieve the results taught in this disclosure. The preceding operational flows have been offered for purposes of example and discussion. Substantial flexibility is provided by the embodiments in that any suitable arrangements, chronologies, configurations, and timing mechanisms may be provided without departing from the teachings of the discussed concepts.

As used herein, unless expressly stated to the contrary, use of the phrase 'at least one of', 'one or more of', 'and/or', variations thereof, or the like are open-ended expressions that are both conjunctive and disjunctive in operation for any and all possible combinations of the associated listed items. For example, each of the expressions 'at least one of X, Y and Z', 'at least one of X, Y or Z', 'one or more of X, Y and Z', 'one or more of X, Y or Z' and 'X, Y and/or Z' can mean any of the following: 1) X, but not Y and not Z; 2) Y, but not X and not Z; 3) Z, but not X and not Y; 4) X and Y, but not Z; 5) X and Z, but not Y; 6) Y and Z, but not X; or 7) X, Y, and Z.

Each example embodiment disclosed herein has been included to present one or more different features. However, all disclosed example embodiments are designed to work together as part of a single larger system or method. This disclosure explicitly envisions compound embodiments that combine multiple previously-discussed features in different example embodiments into a single system or method.

Additionally, unless expressly stated to the contrary, the terms 'first', 'second', 'third', etc., are intended to distinguish the particular nouns they modify (e.g., element, condition, node, module, activity, operation, etc.). Unless expressly stated to the contrary, the use of these terms is not intended to indicate any type of order, rank, importance, temporal sequence, or hierarchy of the modified noun. For example, 'first X' and 'second X' are intended to designate two 'X' elements that are not necessarily limited by any order, rank, importance, temporal sequence, or hierarchy of the two elements. Further as referred to herein, 'at least one of and' one or more of can be represented using the '(s)' nomenclature (e.g., one or more element(s)).

One or more advantages described herein are not meant to suggest that any one of the embodiments described herein necessarily provides all of the described advantages or that all the embodiments of the present disclosure necessarily provide any one of the described advantages. Numerous other changes, substitutions, variations, alterations, and/or modifications may be ascertained to one skilled in the art and it is intended that the present disclosure encompass all such changes, substitutions, variations, alterations, and/or modifications as falling within the scope of the appended claims.

In one form, a method is provided. The method comprises: generating, by a network device, a message for a corresponding node of a network to establish a quantum key, wherein the network includes a plurality of nodes and a quantum relay; sending, by the network device, the message over a path of the network to the corresponding node, wherein the message includes identities of the network device and one or more nodes in the path encrypted with a corresponding quantum key and a sender of the message indicated as an adjacent node of the corresponding node to maintain secrecy of the identities; and establishing, by the network device, the quantum key with the corresponding node via the quantum relay based on a response to the message.

In one example, the network includes an anonymous communication network and the quantum key is established via a quantum key distribution protocol.

In one example, the anonymous communication network includes a Tor network.

In one example, the method further comprises receiving, by the network device, the response to the message from the corresponding node, wherein the response is relayed through the one or more nodes that each decrypt an encrypted identity of a next node using the corresponding quantum key to send the response along the path to the network device.

In one example, the path includes an entry node, a middle node, and an exit node each associated with a corresponding quantum key for decryption of an encrypted identity to relay the response along the path to the network device.

In one example, the method further comprises: sending, by the network device, the message to the middle node, wherein the message includes an identity of the network device encrypted with a corresponding quantum key for the entry node and a sender of the message indicated as the entry node; and establishing, by the network device, the quantum key with the middle node via the quantum relay based on the response to the message.

In one example, the method further comprises: sending, by the network device, the message to the exit node, wherein the message includes an identity of the network device encrypted with a corresponding quantum key for the entry node, an identity of the entry node encrypted with a corresponding quantum key for the middle node, and a sender of the message indicated as the middle node; and establishing, by the network device, the quantum key with the exit node via the quantum relay based on the response to the message.

In another form, an apparatus is provided. The apparatus comprises: a network interface configured to enable network communications in a network that includes a plurality of nodes and a quantum relay; and one or more processors coupled to the network interface, wherein the one or more processors are configured to: generate a message for a corresponding node of a network to establish a quantum key, wherein the message includes identities of the apparatus and one or more nodes in a path of the network encrypted with a corresponding quantum key and a sender of the message indicated as an adjacent node of the corresponding node to maintain secrecy of the identities; cause the network interface to send the message over the path of the network to the corresponding node; and establish the quantum key with the corresponding node via the quantum relay based on a response to the message.

In another form, one or more non-transitory computer readable storage media are provided. The non-transitory computer readable storage media are encoded with processing instructions that, when executed by one or more processors of a network device, cause the one or more processors to: generate a message for a corresponding node of a network to establish a quantum key, wherein the network includes a plurality of nodes and a quantum relay; send the message over a path of the network to the corresponding node, wherein the message includes identities of the network device and one or more nodes in the path encrypted with a corresponding quantum key and a sender of the message indicated as an adjacent node of the corresponding node to maintain secrecy of the identities; and establish the quantum key with the corresponding node via the quantum relay based on a response to the message.

The above description is intended by way of example only. Although the techniques are illustrated and described herein as embodied in one or more specific examples, it is nevertheless not intended to be limited to the details shown, since various modifications and structural changes may be made within the scope and range of equivalents of the claims.

What is claimed is:

1. A method comprising:

generating, by a network device, a message for a corresponding node along a path of a network to establish a quantum key with the corresponding node, wherein the network includes a plurality of nodes and a quantum relay for quantum communication and at least one node resides between the network device and the corresponding node along the path;

sending, by the network device, the message over the network to the corresponding node via classical communication, wherein a sender of the message is indicated as an adjacent node of the corresponding node along the path from the network device to the corresponding node and identities of the network device and each node along the path between the network device and the adjacent node are encrypted in the message with a corresponding quantum key to maintain secrecy of the identities from the corresponding node;

receiving, by the network device, a response to the message sent along the path from the corresponding node via classical communication, wherein the response includes information for quantum communication with the corresponding node via the quantum relay; and establishing, by the network device, the quantum key with the corresponding node via quantum communication with the corresponding node through the quantum relay based on the information for quantum communication in the response to the message, wherein the quantum communication is sent anonymously via the quantum relay to maintain secrecy of an identity of the network device from the corresponding node.

2. The method of claim 1, wherein the network includes an anonymous communication network and the quantum key is established via a quantum key distribution protocol.

3. The method of claim 2, wherein the anonymous communication network includes an onion router network.

4. The method of claim 1, wherein the response is relayed through one or more nodes that each decrypt an encrypted identity of a next node using the corresponding quantum key to send the response along the path to the network device.

5. The method of claim 1, wherein the path includes an entry node, a middle node, and an exit node each associated with a corresponding quantum key for decryption of an encrypted identity to relay the response along the path to the network device.

6. The method of claim 5, further comprising:

sending, by the network device, the message to the middle node, wherein the message includes an identity of the network device encrypted with a corresponding quantum key for the entry node and a sender of the message indicated as the entry node; and establishing, by the network device, the quantum key with the middle node via the quantum relay based on the response to the message.

7. The method of claim 5, further comprising:

sending, by the network device, the message to the exit node, wherein the message includes an identity of the network device encrypted with a corresponding quantum key for the entry node, an identity of the entry node encrypted with a corresponding quantum key for the middle node, and a sender of the message indicated as the middle node; and establishing, by the network device, the quantum key with the exit node via the quantum relay based on the response to the message.

8. An apparatus comprising:

a network interface configured to enable network communications in a network that includes a plurality of nodes and a quantum relay for quantum communication; and one or more processors coupled to the network interface, wherein the one or more processors are configured to perform operations including:

generating a message for a corresponding node along a path of a network to establish a quantum key with the corresponding node, wherein at least one node resides between the apparatus and the corresponding node along the path;

causing the network interface to send the message over the network to the corresponding node via classical communication, wherein a sender of the message is indicated as an adjacent node of the corresponding node along the path from the apparatus to the corresponding node and identities of the apparatus and each node along the path between the apparatus and the adjacent node are encrypted in the message with a corresponding quantum key to maintain secrecy of the identities from the corresponding node;

causing the network interface to receive a response to the message sent along the path from the corresponding node via classical communication, wherein the response includes information for quantum communication with the corresponding node via the quantum relay; and establishing the quantum key with the corresponding node via quantum communication with the corresponding node through the quantum relay based on the information for quantum communication in the response to the message, wherein the quantum communication is sent anonymously via the quantum relay to maintain secrecy of an identity of the apparatus from the corresponding node.

9. The apparatus of claim 8, wherein the network includes an onion router network and the quantum key is established via a quantum key distribution protocol.

10. The apparatus of claim 8, wherein the response is relayed through one or more nodes that each decrypt an encrypted identity of a next node using the corresponding quantum key to send the response along the path to the apparatus.

11. The apparatus of claim 8, wherein the path includes an entry node, a middle node, and an exit node each associated with a corresponding quantum key for decryption of an encrypted identity to relay the response along the path to the apparatus.

12. The apparatus of claim 11, wherein the one or more processors are further configured to:

send the message to the middle node, wherein the message includes an identity of the apparatus encrypted with a corresponding quantum key for the entry node and a sender of the message indicated as the entry node; and establish the quantum key with the middle node via the quantum relay based on the response to the message.

13. The apparatus of claim 11, wherein the one or more processors are further configured to:

send the message to the exit node, wherein the message includes an identity of the apparatus encrypted with a corresponding quantum key for the entry node, an identity of the entry node encrypted with a corresponding quantum key for the middle node, and a sender of the message indicated as the middle node; and establish the quantum key with the exit node via the quantum relay based on the response to the message.

14. One or more non-transitory computer readable storage media encoded with processing instructions that, when executed by one or more processors of a network device, cause the one or more processors to perform operations including:

generating a message for a corresponding node along a path of a network to establish a quantum key with the corresponding node, wherein the network includes a plurality of nodes and a quantum relay for quantum communication and at least one node resides between the network device and the corresponding node along the path;

sending the message over the network to the corresponding node via classical communication, wherein a sender of the message is indicated as an adjacent node of the corresponding node along the path from the network device to the corresponding node and identities of the network device and each node along the path between the network device and the adjacent node are encrypted in the message with a corresponding quantum key to maintain secrecy of the identities from the corresponding node;

receiving a response to the message sent along the path from the corresponding node via classical communication, wherein the response includes information for quantum communication with the corresponding node via the quantum relay; and establishing the quantum key with the corresponding node via quantum communication with the corresponding node through the quantum relay based on the information for quantum communication in the response to the message, wherein the quantum communication is sent anonymously via the quantum relay to maintain secrecy of an identity of the network device from the corresponding node.

15. The one or more non-transitory computer readable storage media of claim 14, wherein the network includes an anonymous communication network and the quantum key is established via a quantum key distribution protocol.

16. The one or more non-transitory computer readable storage media of claim 15, wherein the anonymous communication network includes an onion router network.

17. The one or more non-transitory computer readable storage media of claim 14, wherein the response is relayed through one or more nodes that each decrypt an encrypted identity of a next node using the corresponding quantum key to send the response along the path to the network device.

18. The one or more non-transitory computer readable storage media of claim 14, wherein the path includes an entry node, a middle node, and an exit node each associated with a corresponding quantum key for decryption of an encrypted identity to relay the response along the path to the network device.

19. The one or more non-transitory computer readable storage media of claim 18, wherein the processing instructions further cause the one or more processors to:

send the message to the middle node, wherein the message includes an identity of the network device encrypted with a corresponding quantum key for the entry node and a sender of the message indicated as the entry node; and establish the quantum key with the middle node via the quantum relay based on the response to the message.

20. The one or more non-transitory computer readable storage media of claim 18, wherein the processing instructions further cause the one or more processors to:

send the message to the exit node, wherein the message includes an identity of the network device encrypted with a corresponding quantum key for the entry node, an identity of the entry node encrypted with a corresponding quantum key for the middle node, and a sender of the message indicated as the middle node; and establish the quantum key with the exit node via the quantum relay based on the response to the message.

* * * * *